(12) United States Patent
Liu et al.

(10) Patent No.: US 10,343,613 B1
(45) Date of Patent: Jul. 9, 2019

(54) GLOVEBOX ASSEMBLY WITH AN INTERLOCKING DOWNSTOP

(71) Applicant: FORD GLOBAL TECHNOLOGIES, LLC, Dearborn, MI (US)

(72) Inventors: Frank Qiukui Liu, Canton, MI (US); Francis Raymond Gillis, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 20 days.

(21) Appl. No.: 15/855,430

(22) Filed: Dec. 27, 2017

(51) Int. Cl.
*B60R 7/06* (2006.01)

(52) U.S. Cl.
CPC .................. *B60R 7/06* (2013.01)

(58) Field of Classification Search
CPC ............ B60R 7/06; B60R 2011/0059; B60R 2011/005
USPC ............................................. 296/37.12, 37.8
See application file for complete search history.

(56) References Cited

U.S. PATENT DOCUMENTS

| 5,385,378 A | 1/1995 | Hakamada et al. |
| 5,598,142 A * | 1/1997 | Winner, Jr. ............. B60R 11/00 109/20 |
| 5,845,954 A | 12/1998 | DePue |
| 6,076,878 A | 6/2000 | Isano |
| 6,749,242 B2 | 6/2004 | Park |
| 6,899,364 B2 | 5/2005 | Park et al. |
| 6,945,579 B2 | 9/2005 | Peck, Jr. et al. |
| 8,403,392 B2 | 3/2013 | Okimoto |
| 9,637,061 B2 | 5/2017 | Mazzocchi et al. |
| 2007/0096489 A1 | 5/2007 | Park |
| 2017/0218664 A1* | 8/2017 | Ben Abdelaziz ....... E05B 83/30 |

FOREIGN PATENT DOCUMENTS

| CN | 203294003 U | 11/2013 |
| JP | S57175474 A | 10/1982 |
| KR | 100654978 B1 | 11/2006 |
| KR | 101250689 B1 | 4/2013 |

OTHER PUBLICATIONS

English Machine Translation of CN203294003U.
English Machine Translation of JPS57175474A.
English Machine Translation of KR100654978B1.
English Machine Translation of KR101250689B1.

* cited by examiner

*Primary Examiner* — Dennis H Pedder
(74) *Attorney, Agent, or Firm* — Vichit Chea; King & Schickli PLLC

(57) ABSTRACT

A glovebox assembly includes a support substrate, a glovebox rotationally displaceable with respect to the support substrate, a downstop carried on the support substrate and an interlock feature carried on the support substrate. The downstop includes a stalk and a head. The interlock feature overlaps the stalk adjacent the head.

20 Claims, 9 Drawing Sheets

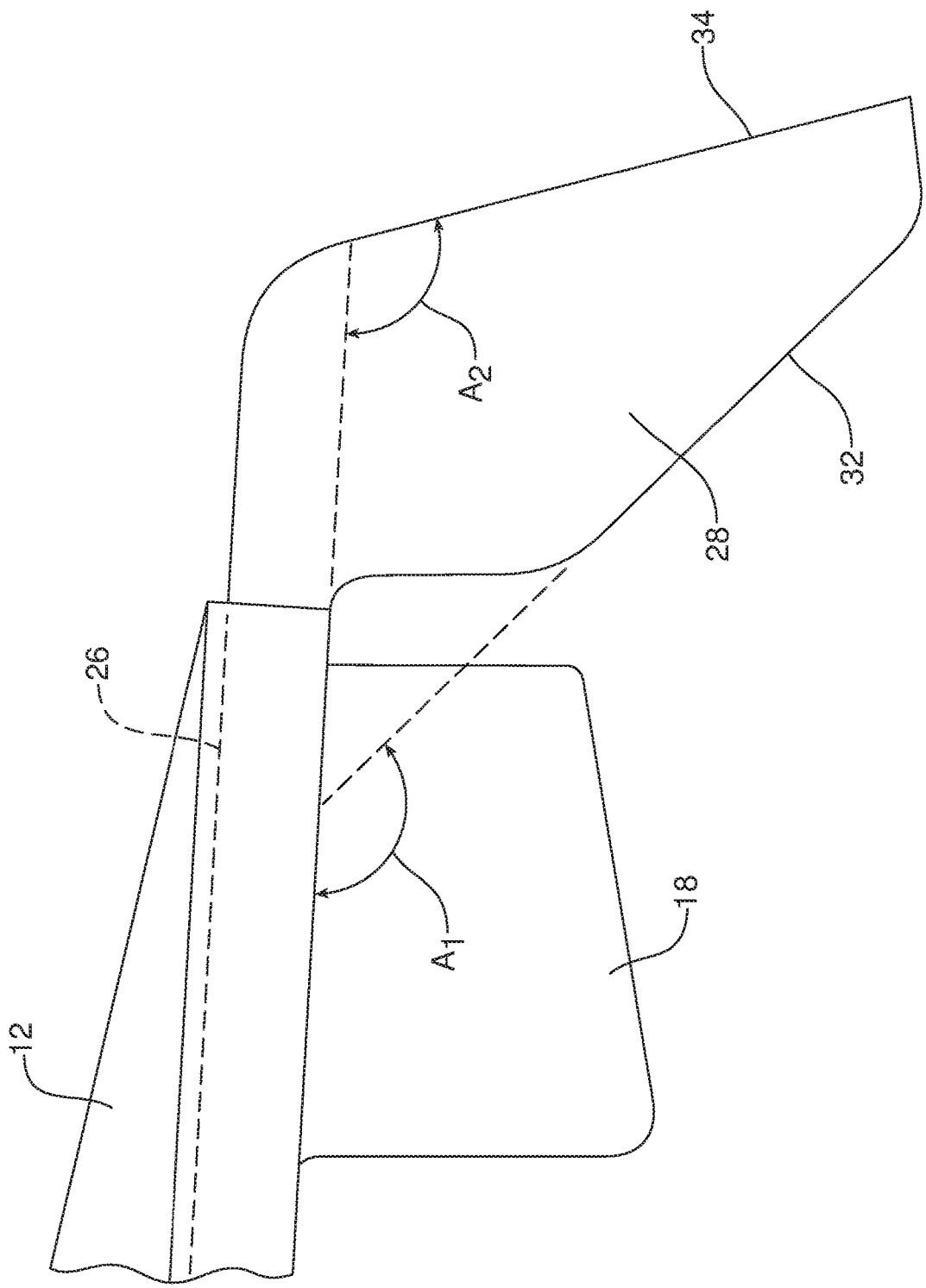

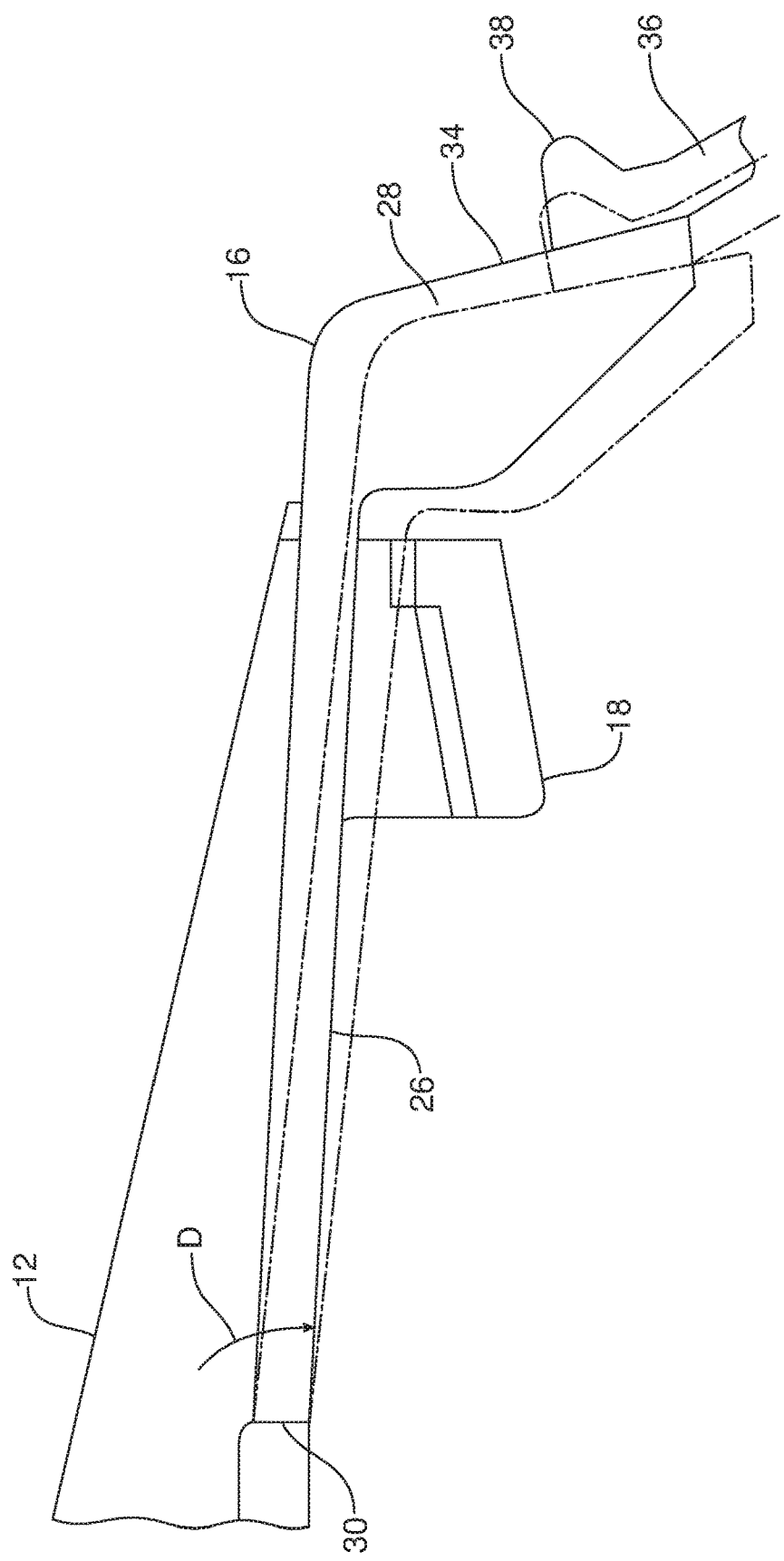

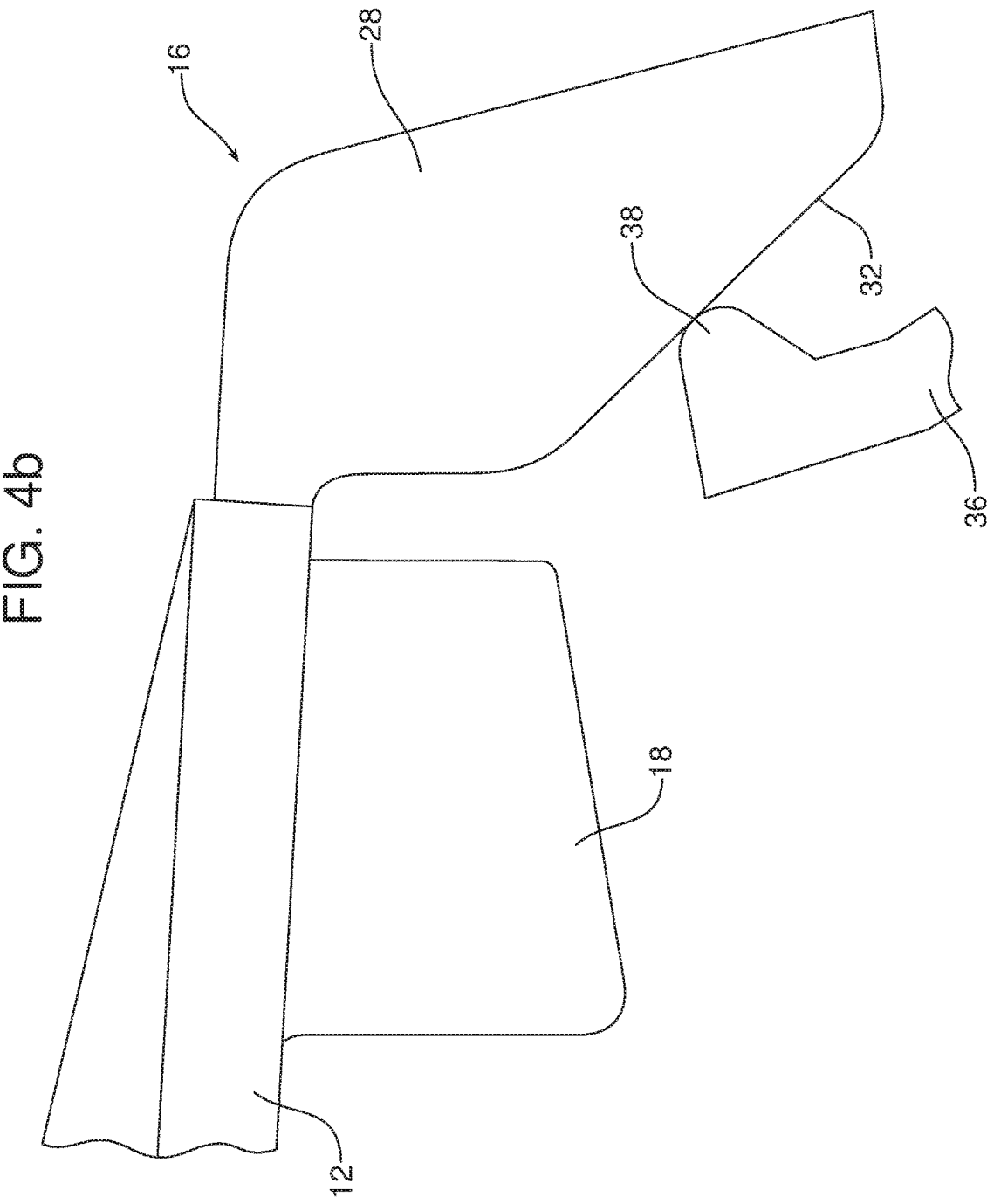

GLOVEBOX ASSEMBLY WITH AN INTERLOCKING DOWNSTOP

TECHNICAL FIELD

This document relates generally to the motor vehicle equipment field, and more particularly, to a glovebox assembly including an interlocking downstop.

BACKGROUND

Motor vehicles today are almost universally equipped with a glovebox assembly mounted within a dashboard or instrument panel of the motor vehicle. Such a glovebox assembly typically includes a support substrate, a glovebox compartment and an access door that is pivotally mounted and may be rotationally displaced to open the glovebox assembly and allow access to the glovebox compartment.

This document relates to a new and improved glovebox assembly incorporating an interlocking downstop that advantageously provides low disengagement effort to allow for ease of installation and removal for maintenance of the glovebox door while also meeting the seemingly conflicting goal of providing a robust design to better withstand customer abuse loads.

SUMMARY

In accordance with the purposes and benefits described herein, a new and improved glovebox assembly is provided. That glovebox assembly comprises a support substrate, a glovebox rotationally displaceable with respect to the support substrate, a downstop carried on the support substrate and an interlock feature carried on the support substrate. The downstop may include a stalk and a head carried on the stalk. The interlock feature may overlap the stalk adjacent the head.

In some of the many possible embodiments, the support substrate may comprise a glovebox surround. In some of the many possible embodiments, the support substrate may comprise a portion of a dashboard or instrument panel.

The glovebox may include a door and an integral storage compartment. A hinge may connect the glovebox to the support substrate.

The stalk may include a proximal end connected to the support substrate and a distal end carrying the head. The head may include an installation feature and a glovebox retention feature. The installation feature may define a first included angle $A_1$ with the stalk and the retention feature may define a second included angle $A_2$ with the stalk. Further, the first included angle $A_1$ may be provided inside the second included angle $A_2$. In some of the many possible embodiments, the first included angle $A_1$ may be between 120 degrees and 160 degrees while the second included angle $A_2$ may be between 90 degrees and 130 degrees.

In some of the many possible embodiments, the first included angle $A_1$ may be about 140 degrees and the second included angel $A_2$ may be about 110 degrees. The interlock feature may be oriented on the support substrate toward the glovebox.

The proximal end of the stalk may be connected to the support substrate by a hinge. In addition, the glovebox may include a rear wall opposite the door. That rear wall may include a radiused cam. That radiused cam may be oriented to engage the installation feature when the glove box is installed in the glovebox assembly.

The stalk may be displaced from a home position to a first deflected position away from the interface feature when installing the glovebox or removing the glovebox for service. The stalk may be displaced from the home position to a second deflected position in engagement with the interlock feature when the glovebox is fully opened and an additional load (i.e. a customer abuse load) is placed upon the glovebox in an opening direction. The home position may be between the first deflected position and the second deflected position. Further, the second deflected position may be toward a storage compartment of the glovebox.

In the following description, there are shown and described several preferred embodiments of the glovebox assembly. As it should be realized, the glovebox assembly is capable of other, different embodiments and its several details are capable of modification in various, obvious aspects all without departing from the glovebox assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the glovebox assembly and together with the description serve to explain certain principles thereof.

FIG. 2a is a detailed side elevational view of a downstop and cooperating interlock feature of the glovebox assembly illustrated in FIG. 1.

FIG. 2b is a perspective view from below of the structure illustrated in FIG. 2a.

FIG. 3b is a detailed view of the downstop and interlock feature of the glovebox assembly in the fully open position.

FIGS. 4a and 4b illustrate installation of the glovebox into the glovebox assembly. More specifically, FIG. 4a is a cross sectional view of the entire glovebox assembly while FIG. 4b is a detailed view of the downstop and interlock feature during installation.

Reference will now be made in detail to the present preferred embodiments of the glovebox assembly, examples of which are illustrated in the accompanying drawing figures.

DETAILED DESCRIPTION

Figure 1:
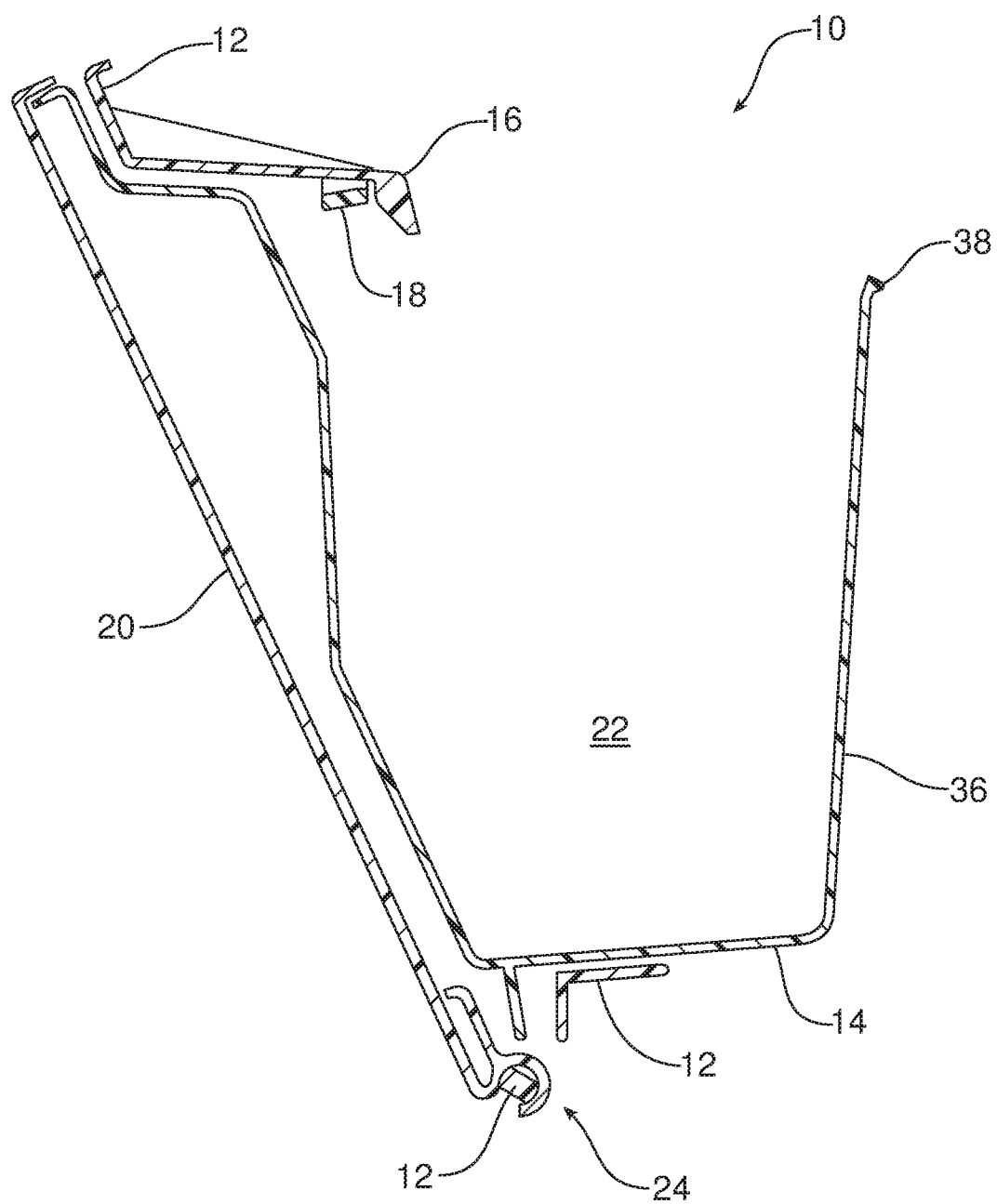
FIG. 1 is a cross sectional view of the glovebox assembly illustrating the glovebox in a fully closed position.

Reference is now made to FIG. 1 illustrating the glovebox assembly 10 in a closed position. The glovebox assembly 10 includes a support substrate 12, a glovebox 14, a downstop 16, carried on the support substrate, and an interlock feature 18 carried on the support substrate. The support substrate 12 may comprise, for example, a glovebox surround or a portion of the dashboard or instrument panel.

The glovebox 14 in the illustrated embodiment includes a door 20 and a storage compartment 22. A hinge, generally designated by reference numeral 24 connects the glovebox 14 to the support substrate 12 so that the glovebox may be rotationally displaceable with respect to the support substrate.

As best illustrated in FIGS. 1, 2a, 2b and 2c, the downstop 16 includes a stalk 26 and a head 28. More specifically, the head 28 is connected to the distal end of the stalk 26 while the proximal end of the stalk is connected to the support substrate 12 by means of a hinge 30. The head 28 includes an installation feature 32 and a glovebox retention feature 34 described in greater detail below.

As illustrated in FIG. 2a, the installation feature 32 defines a first included angle $A_1$ with the stalk 26 and the glovebox retention feature 34 defines a second included angle $A_2$ with the stalk. As shown, the first included angle $A_1$ is provided inside the second included angle $A_2$. Consistent with this, the installation feature 32 and the first included angle $A_1$ are closer to the hinge 30 at the proximal end of the stalk 26 than the glovebox retention feature 34 and the second included angle $A_2$. It should also be appreciated that the installation feature 32 is oriented toward the hinge 30 at the proximal end of the stalk 26 while the glovebox retention feature is oriented away from the hinge.

In some of the many possible embodiments of the glovebox assembly 10, the first included angle $A_1$ is between 120 degrees and 160 degrees and the second included angle $A_2$ is between 90 degrees and 130 degrees. In one particularly useful embodiment, the first included angle $A_1$ is about 140 degrees and the second included angle $A_2$ is about 110 degrees.

Figure 3A:
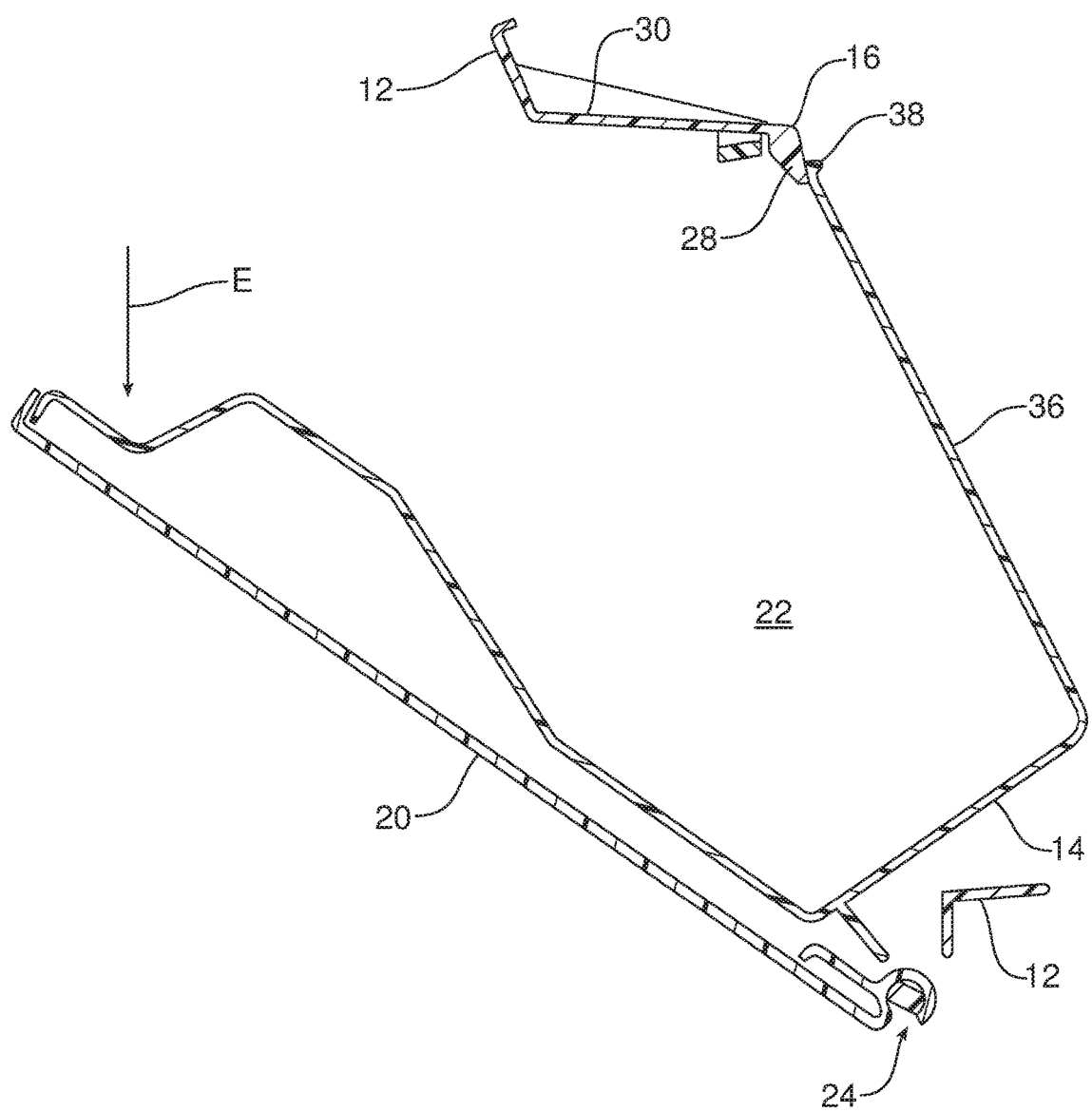
FIG. 3a is a cross sectional view illustrating the glovebox assembly in the fully open position.

As should be appreciated from reviewing FIGS. 1 and 3a, the interlock feature 18 is carried on the support substrate 12 and overlaps the stalk 26 adjacent or near the head 28. Further, the interlock feature 18 is oriented on the support substrate 12 toward the glovebox 14.

Figure 4A:
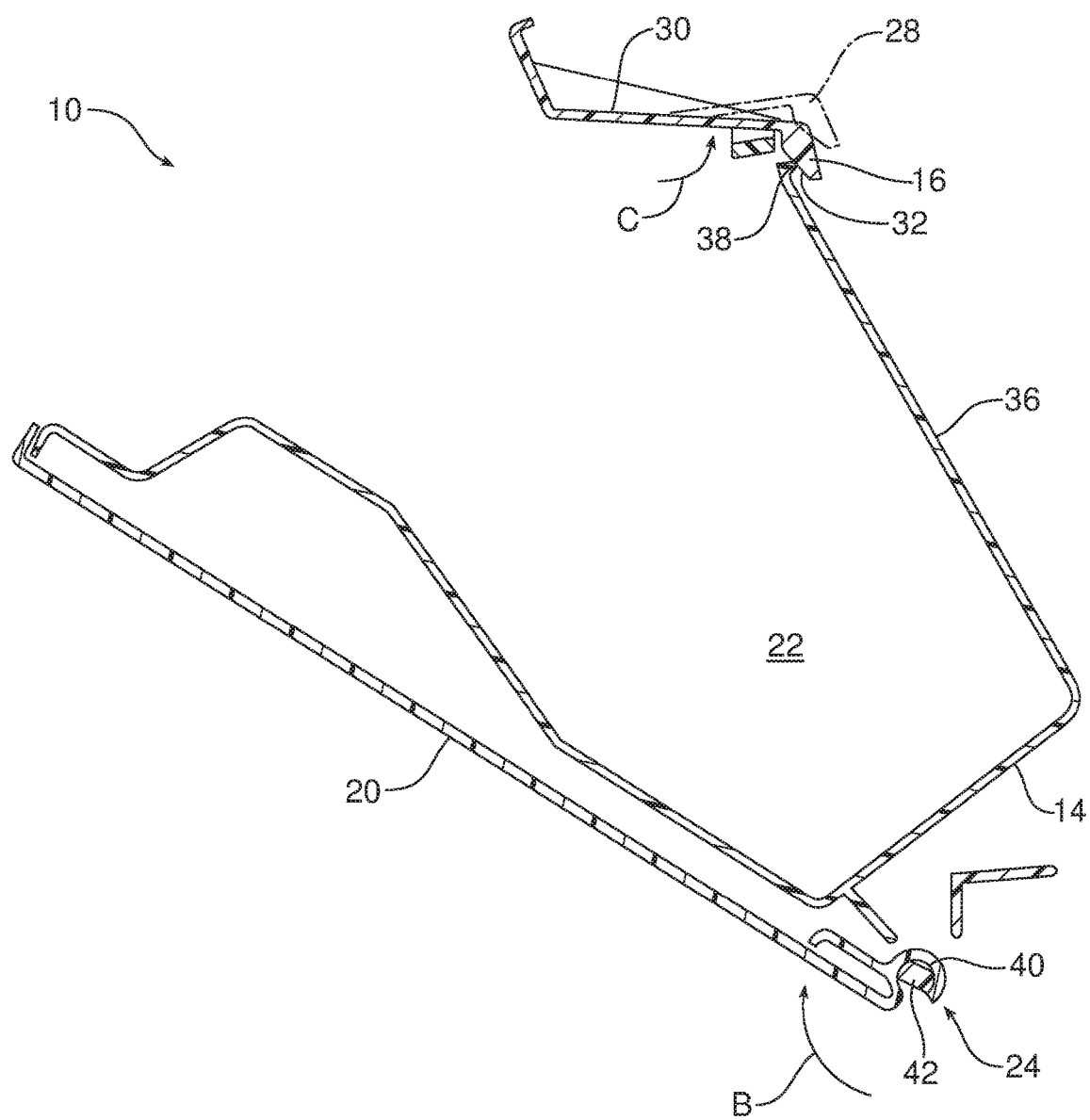

The glovebox 14 includes a rear wall 36 opposite the door 20. That rear wall 36 includes a radiused cam 38 at its terminal edge. As illustrated in FIG. 4a and FIG. 4b, the radiused cam 38 is oriented to engage the installation feature 32 when the glovebox 14 is installed in the support substrate 12 of the glovebox assembly 10.

More specifically, first the installer engages the hook 40 with the pivot shaft 42 of the support substrate 12 in order to complete assembly of the hinge 24. The glovebox 14 is then rotated in the direction of action arrow B about the hinge 24 until the radiused cam 38 engages the installation feature 32 of the downstop 16. As the installer continues to rotate the glovebox 14 in the direction of action arrow B, the radiused cam 38 rides along the sloped face of the installation feature 32 causing the installation feature 32 to pivot about the hinge 30 in the direction of action arrow C until the downstop 16 is pivoted sufficiently (see phantom line position in FIG. 4a) to allow the radiused cam 38 on the rear wall 36 to pass the head 28 and complete the installation of the glovebox 14. Accordingly, it should be appreciated that the glovebox 14 may be installed in a simple and efficient manner without placing any substantial stress on the downstop 16 and thus, protecting the downstop from any damage.

When the installed glovebox 14 is displaced by rotation about the hinge 24 from the fully closed position illustrated in FIG. 1 to the fully open position illustrated in FIG. 3a, the rear wall 36 of the glovebox, behind the radiused cam 38 engages the glovebox retention feature 34 on the head 28 of the downstop 16. When this occurs, the downstop 16 pivots about the hinge 30 in the direction of action arrow D in FIG. 3b providing a damping effect for improved feel and smooth operation.

In the event the user intentionally or inadvertently pushes down on the glovebox 14 in the opening direction (note action arrow E in FIG. 3a), the stalk 26 of the downstop 16 engages the interlock feature 18 as shown in phantom line in FIG. 3b. As a result, the interlock feature 18 effectively supports the downstop 16, preventing the downstop from disengaging from the rear wall 36 of the glovebox 14 and effectively holding the glovebox 14 in the fully open position against the abuse load.

Should it ever be necessary to remove the glovebox 14 from the support substrate 12 for maintenance purposes, that may be done in a simple and efficient manner without placing any stress on the downstop 16 thereby allowing the downstop to be protected from inadvertent damage. Toward this end, one uses a finger, screwdriver or other tool to pivot the downstop 16 upward in the direction of action arrow C as illustrated in FIG. 4a until the downstop is in the illustrated phantom line position. This provides the necessary clearance to allow the rear wall 36 of the glovebox 14 to pass the head 28 of the downstop. It is then a simple matter to disengage the hook 40 from the pivot shaft 42 of the hinge 24 and fully remove the glovebox 14 from the support substrate 12.

Figure 2B:
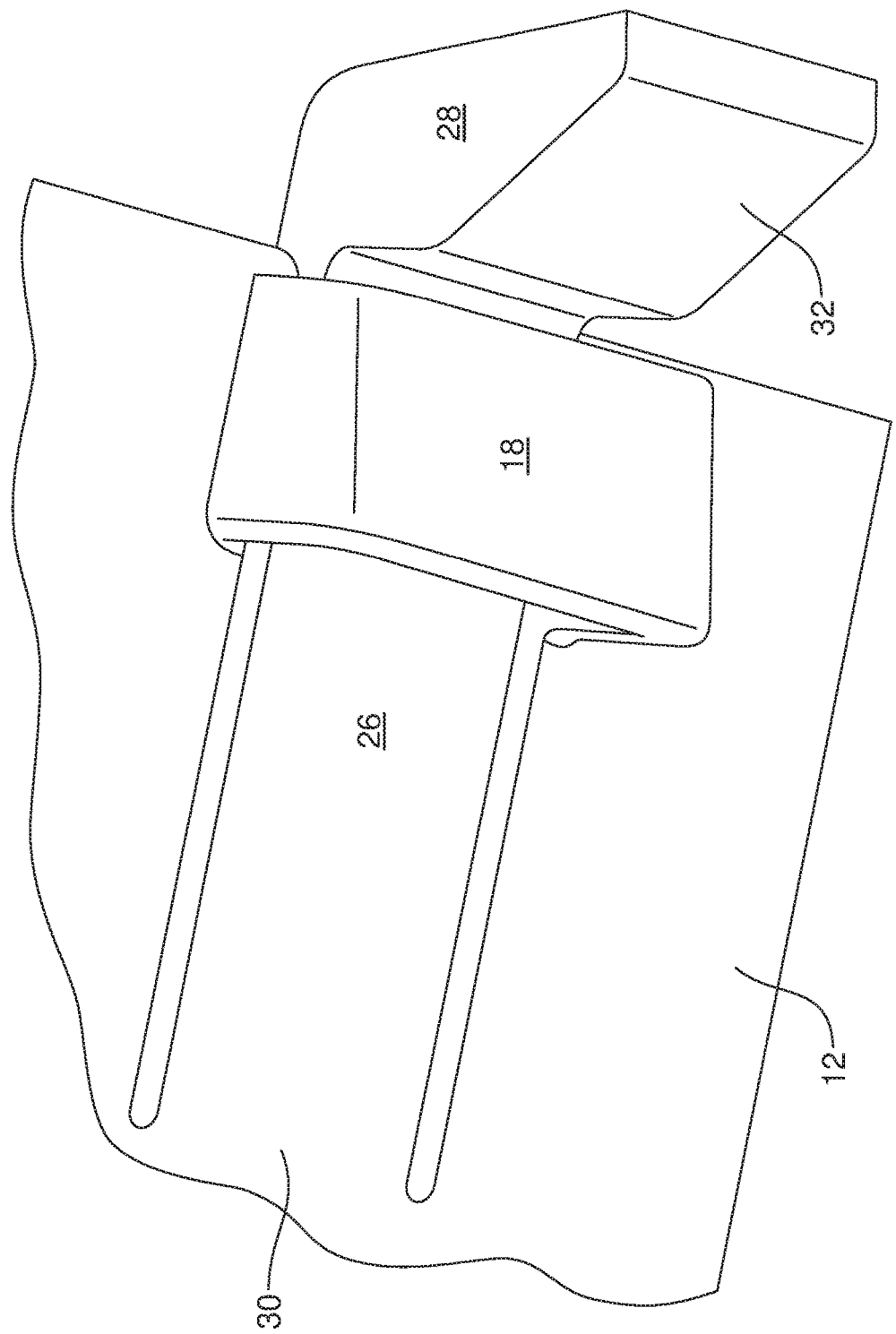
Figure 2C:
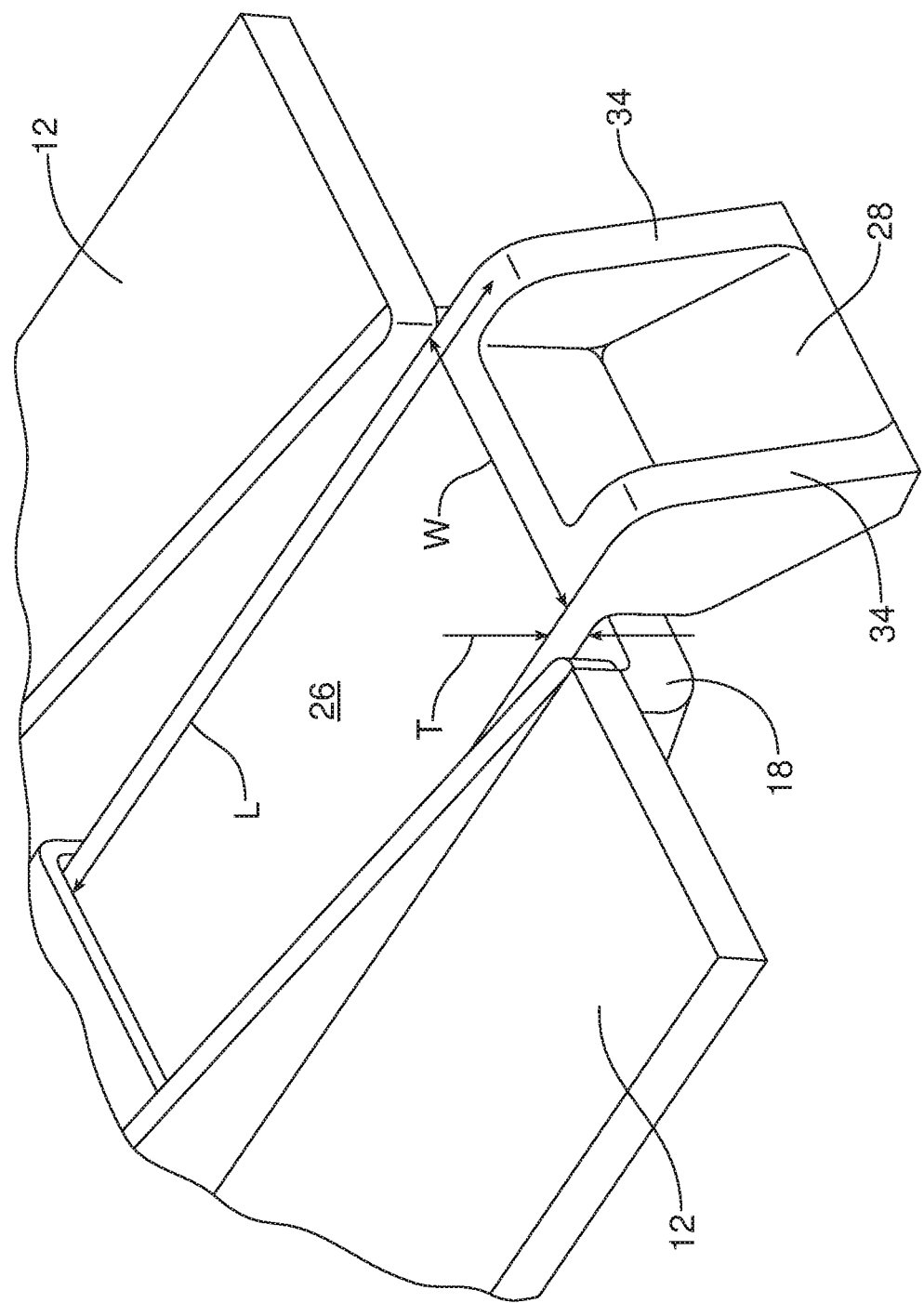
FIG. 2c is a perspective view from above of the structure illustrated in FIGS. 2a and 2b.

As should be appreciated from viewing FIG. 2c, it is a relatively simple matter to fine tune the performance characteristics of the downstop 16. This may be done by optimizing the downstop length L, the downstop width W and the downstop thickness T.

Figure 5:
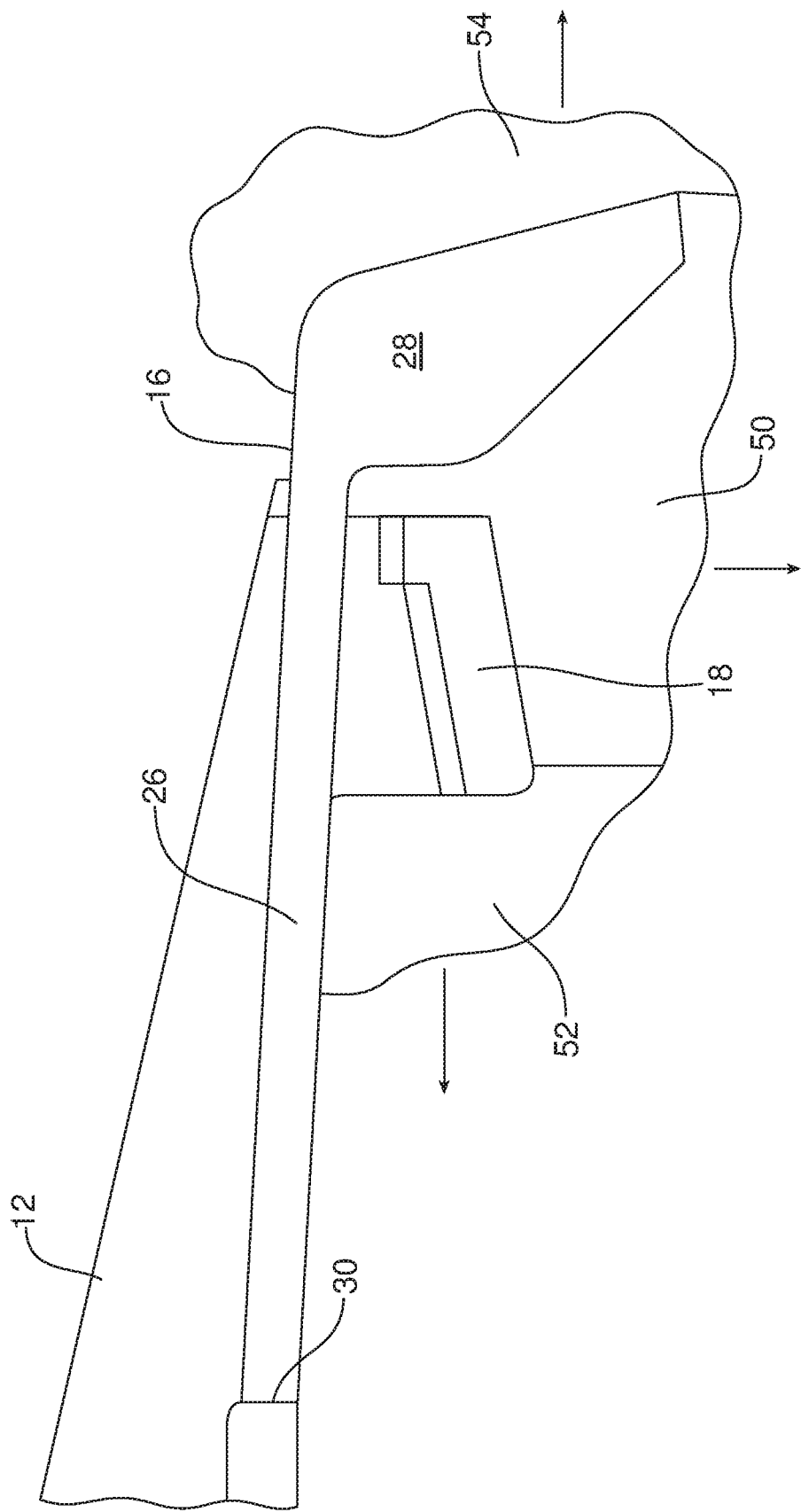
FIG. 5 is a schematic illustration of injection molding tooling for the interlock and downstop design.

It should also be noted that the downstop 16 may be integrally formed as a part of the support substrate 12 by injection molding. While the integrated interlocking feature 18 generates an undercut condition, a lifter 50 may be used to solve the issue. Note FIG. 5 showing how the interlock feature 18 may be injection molded between the cavity steel 52, the lifter 50 and the core steel 54. The lifter 50, cavity steel 52 and core steel 54 may be opened as per the action arrows in order to remove the support substrate 12 and downstop 16 from the mold when cured.

The foregoing has been presented for purposes of illustration and description. It is not intended to be exhaustive or to limit the embodiments to the precise form disclosed. Obvious modifications and variations are possible in light of the above teachings. For example, the glovebox assembly 10 could include one, two or more downstops 16 with interlocking features 18 depending upon the particular application and size of the glovebox 14. All such modifications and variations are within the scope of the appended claims when interpreted in accordance with the breadth to which they are fairly, legally and equitably entitled.

What is claimed:

1. A glovebox assembly, comprising:
   a support substrate;
   a glovebox rotationally displaceable with respect to said support substrate;
   a downstop carried on said support substrate, said downstop including a stalk and a head carried on said stalk; and
   an interlock feature carried on said support substrate and overlapping said stalk adjacent said head.

2. The glovebox assembly of claim 1, wherein said support substrate is a glovebox surround.

3. The glovebox assembly of claim 1, wherein said support substrate is a portion of an instrument panel.

4. The glovebox assembly of claim 1, wherein said glovebox includes a door and a storage compartment.

5. The glovebox assembly of claim 4, further including a hinge connecting said glovebox to said support substrate.

6. The glovebox assembly of claim 5, wherein said stalk includes a proximal end connected to said support substrate and a distal end carrying said head.

7. The glovebox assembly of claim 6, wherein said head includes an installation feature and a glovebox retention feature.

8. The glovebox assembly of claim 7, wherein said installation feature defines a first included angle $A_1$ with said stalk and said glovebox retention feature defines a second included angle $A_2$ with said stalk wherein $A_1 > A_2$.

9. The glovebox assembly of claim 8, wherein said first included angle $A_1$ is provided inside said second included angle $A_2$.

10. The glovebox assembly of claim 9, wherein said first included angle $A_1$ is between 120 degrees and 160 degrees and said second included angle $A_2$ is between 90 degrees and 130 degrees.

11. The glovebox assembly of claim 9, wherein said first included angle $A_1$ is about 140 degrees and said second included angle $A_2$ is about 110 degrees.

12. The glovebox assembly of claim 11, wherein said interlock feature is oriented on said support substrate toward said glovebox.

13. The glovebox assembly of claim 12, wherein said proximal end of said stalk is connected to said support substrate by a hinge.

14. The glovebox assembly of claim 13, wherein said glovebox includes a rear wall opposite said door, said rear wall including a radiused cam.

15. The glovebox assembly of claim 14, wherein said radiused cam is oriented to engage said installation feature when said glovebox is installed in said glovebox assembly.

16. The glovebox assembly of claim 1, wherein said stalk is displaced from a home position to a first deflected position away from said interlock feature when installing said glovebox or removing said glovebox for service.

17. The glovebox assembly of claim 16, wherein said stalk is displaced from said home position to a second deflected position in engagement with said interlock feature when said glovebox is fully opened and an additional load is placed upon said glovebox in an opening direction.

18. The glovebox assembly of claim 17, wherein said home position is between said first deflected position and said second deflected position.

19. The glovebox assembly of claim 18, wherein said second deflected position is toward a storage compartment of said glovebox.

20. A glovebox assembly, comprising:
 a support substrate;
 a glovebox rotationally displaceable with respect to said support substrate;
 a downstop carried on said support substrate by a hinge; and
 an interlock feature carried on said support substrate and overlapping said downstop.

\* \* \* \* \*